Oct. 16, 1956     R. SCHILLING ET AL     2,766,864
FLUID OPERATED, TORQUE RESPONSIVE CLUTCH DEVICE
Filed April 4, 1952     3 Sheets-Sheet 2

Inventors
Robert Schilling &
Frank J. Roelandt
By
Willits, Helwig & Baillio
Attorneys

United States Patent Office 2,766,864
Patented Oct. 16, 1956

2,766,864

FLUID OPERATED TORQUE RESPONSIVE CLUTCH DEVICE

Robert Schilling, Birmingham, and Frank J. Roelandt, Detroit, Mich., assignors to General Motors Corporation, Detroit, Mich., a corporation of Delaware Application April 4, 1952, Serial No. 280,458

9 Claims. (Cl. 192—85)

This invention relates to torque responsive clutch devices and particularly to devices of this kind which are either manually or automatically operable when the clutch device is rotated in either direction.

It is customary to drive the propeller shaft of a ship with a plurality of engines, each engine having a drive shaft and a driven shaft connected together by a clutch and with a driven shaft of each engine connected by gears or other suitable means to the propeller shaft of the vessel. In some installations of this kind the engines are reversible for reversing the propeller of the vessel and it is therefore necessary to provide clutches which can be engaged or released in either direction. It is sometimes desirable to drive the propeller with all of the engines in either direction and it is also desirable to disconnect one or more of the engines from the propeller and drive the propeller in either direction with the remaining engines. It is also desirable to disconnect any engine from the propeller shaft in the event of power failure in the engine. Various manual and other means have been employed for engaging and disengaging the clutches employed in connecting and releasing the engines from the propeller shaft in such installations but these have not been as effective and reliable as is desirable.

It is now proposed to provide a clutch for such installations in which one element of the clutch may overrun the other in either direction. In the event of a power failure in an engine the overrunning movement of the clutch will automatically release the clutch to disconnect the engine from the propeller shaft. It is also proposed to so control such clutch release means that it may be reversed either by manual effort or in response to the opposite rotation of the engine shaft. Means also is provided for initially providing a slipping connection of the engine to the propeller shaft for starting the engine in either direction, to lock the clutch means so that it will not be torque responsive to release, and to rigidly engage the clutch to drive without slipping but to be torque responsive to release in either direction.

Figure 2:
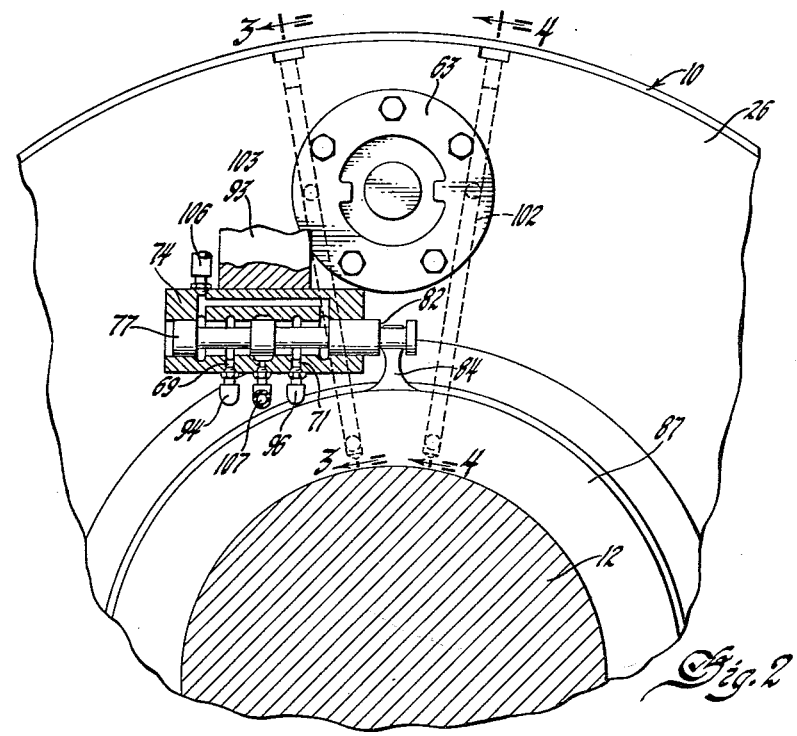
Figure 2 is a fragmentary cross-sectional view of the structure illustrated by Figure 1 and taken substantially in the plane of line 2—2 on Figure 1, looking in the direction of the arrows thereon.
Figure 3:
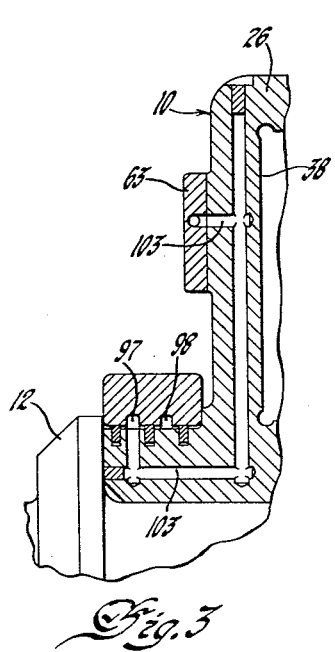
Figure 4:
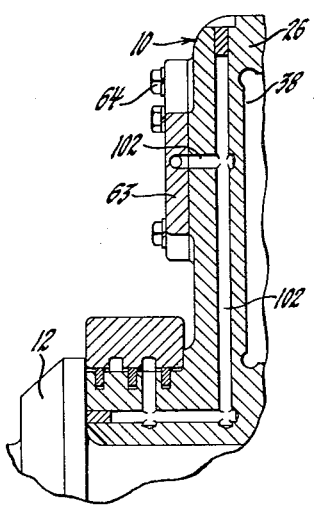
Figure 5:
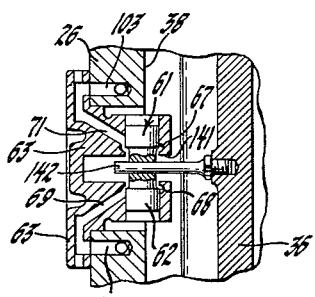

Figures 3, 4, and 5 are fragmentary views of a control and the fluid supply conduits for the clutch mechanism illustrated by the preceding figures. These views are taken substantially in the planes of lines 3—3, 4—4, and 5—5 on Figures 1 and 2, looking in the direction of the arrows thereon.

Figure 6:
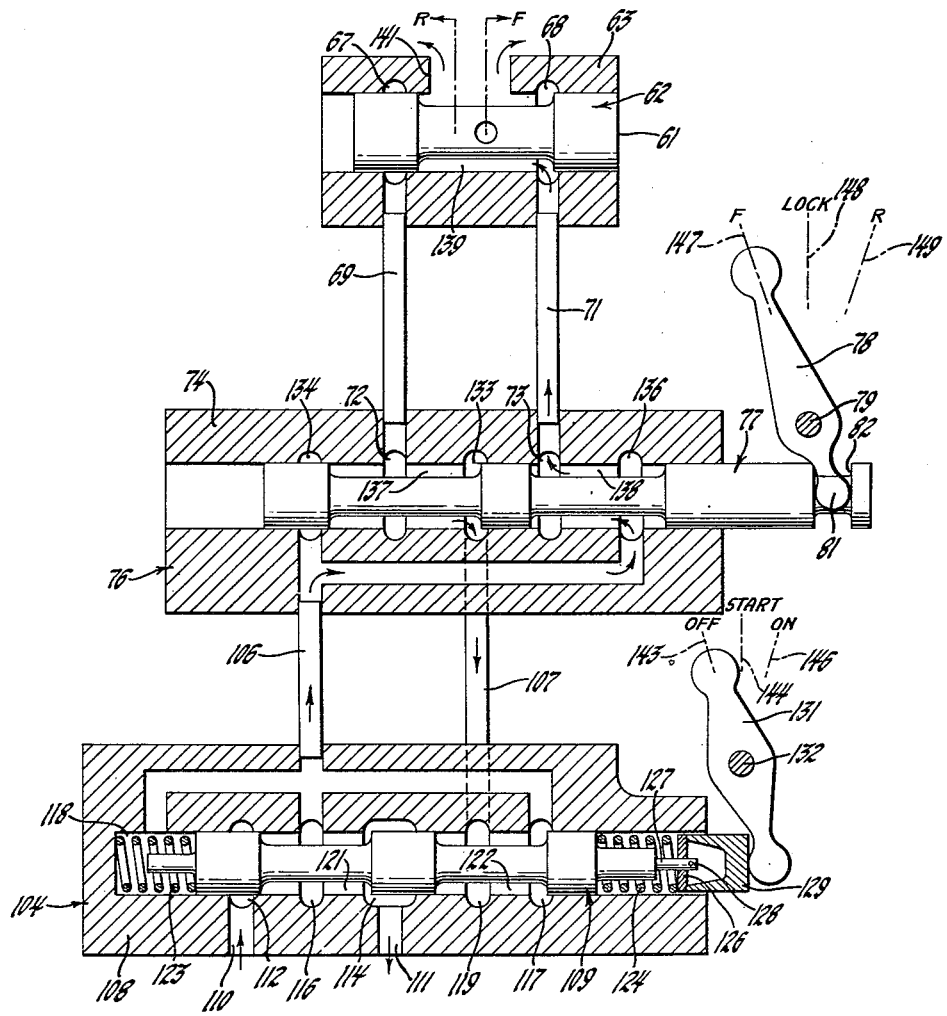

Figure 6 is a diagrammatical illustration of the fluid supply and control means which may be employed in the structure illustrated by the preceding figures. This view embraces a manual means for reversing the control system rather than an automatically operable means such as is employed in the structure disclosed by Figures 1 and 2.

The structure disclosed by Figures 1–5 comprises a clutch means 10 adapted to connect drive shaft 11 to driven shaft 12. The drive shaft 11 may be one of a plurality of shafts for delivering power from reversible engines such as are employed in driving ships and for other purposes. The driven shaft 12 also may be one of a plurality of similar driven shafts by which the power developed by such engines may be delivered to a propeller or other shaft of the ship or other power consuming device. The drive shaft 11 may be secured by a key 13 within a sleeve 14 forming the inner part of a driving element 16 of the clutch 10. The sleeve 14 is formed to provide radial spokes 17 which terminate at the outer peripheries thereof in a cylindrical wall or rim 18 having transversely disposed teeth 19 formed around the outer periphery thereof. The wall or rim 18 has clutch 21 disposed in spaced relation upon the exterior surface thereof. The teeth 19 are received in transversely disposed slots formed around the inner peripheries of the plates 21. Between the plates 21 are disposed other clutch plates 22 which are usually formed of a kind of material which differs from the material from which clutch plates 21 are formed. The plates 22 also are slotted in such a way as to receive teeth 23 formed tranversely along an inner surface of an outer cylindrical wall or rim 24 of the driven element 26 of the clutch 19. The plates 21 and 22 comprise a friction element 27 of the clutch 10, one end of which is adapted to engage a clamping surface 28 formed on an end plate 29 secured to the forward end of the wall 24 by screws indicated at 31. The inner periphery of the end plate 29 surrounds the sleeve 14 of the driving element 16 and is notched in such a way as to receive a sealing ring 32 that is adapted to engage the exterior surface of the sleeve 14. The opposite end of the cylindrical wall 24 of the driven element 26 is closed by an end wall 33 which terminates at the inner periphery thereof in a sleeve 34 which is keyed at 36 to the driven end 37 of the driven shaft 12. The part of the driven element 26 within the friction element 27 is finished in such a way as to provide a cylinder 38 which is adapted to receive a piston 39 having an annular end 41 which projects between the rims 18 and 24 of the driving and driven elements of the clutch 10 to provide an actuating element for compressing the friction element 27 against the engaging surface 28 of the plate 29. The annular end 41 of the piston 39 may have one of the clutch plates 22 secured thereto by a plurality of studs 42 secured to the ring and which project into recesses in the annular end 41 that contain springs indicated at 43. The springs 43 are compressed between the lower ends of the recesses and heads 44 that are formed at the ends of the pins or studs 42. Threaded caps 46 are secured within the ends of the recesses containing the studs 42. The annular piston 39 tends to be retracted in such a way as to release the clutch plates 21 and 22 of the friction element 27 of the clutch 10 by springs which are indicated at 47. One end of each of the springs 47 is seated upon a spring washer 48 within one of a plurality of openings formed in spaced relation to one another around the forward surface of the annular piston 39. The opposite ends of the springs 47 also engage spring washers indicated at 49 which are adapted to be received within recesses formed within the rear wall of an outwardly flanged end 51 of an annular member 52 which is secured by screws 53 to the forward end of the supporting sleeve 34 for the driven element 26 of the clutch 10. The annular member 52 has an inwardly disposed sleeve 54 which is also supported by the reduced end 56 of the shaft 12 and in such manner that the exterior surface thereof forms a pilot bearing for the driving element 16 of the clutch 10. The driving element 16 has a rearwardly disposed sleeve 57 for receiving the sleeve 54. Bolts 58 are rigidly secured to each of the spring washers 48 and project through openings formed in the spring washers 49 for limiting the expansion of the springs 47.

It will be apparent that fluid under pressure introduced into the cylinder 38 will actuate the piston 39 for confining the friction element 27 between the annular engaging surfaces 28 and 41 to drive the driven element 26 of the clutch 10 in response to the rotation of the driving element 16 by the drive shaft 11. If the fluid under pressure is released from the cylinder 38 then the springs 47 will act upon the actuating element or piston 39 in such a way as to release the friction element 27 thereby permitting the discs 21 to rotate with the driving element 16 and the discs 22 to rotate with the driven element 26. It will therefore be possible for the driving and driven elements of the clutch 10 each to rotate independently of the other.

Fluid under pressure is adapted to be supplied to or exhausted from the cylinder 48 by control valve indicated at 61. The control valve 61 also is illustrated in Figure 6 in which a hydraulic system similar to that employed in the structure disclosed by Figures 1–5, is diagrammatically illustrated. The valve 61 comprises a valve member 62 and a valve casing 63, the latter being secured by screws 64 in an opening 66 formed in the wall 33 of the driven member 26 of the clutch 10. The valve casing 63 is provided with annular ports 67 and 68 which are connected by conduits 69 and 71 respectively to other annular ports 72 and 73 formed in the valve body 74 of the second control valve indicated generally by the numeral 76. In the structure disclosed by Figure 6, the valve member 77 of the control valve 76 is adapted to be manually operated by a lever 78 supported by a pin 79 and having a bifurcated end 81 adapted to engage a groove 82 formed in the end of the valve member 77 which projects beyond the casing 74. In the structure disclosed by the preceding figures, and particularly by Figures 1 and 2, the valve member 77 is adapted to be automatically operated by a friction clutch mechanism 83 which is operative in response to the rotation of the driven shaft 12. Since it will be apparent from the following description that the friction clutch mechanism 83 is merely responsive to the direction of rotation of the shaft 12, the friction clutch mechanism 83 would be operable in the same manner if associated with the drive shaft 11.

Figure 1:
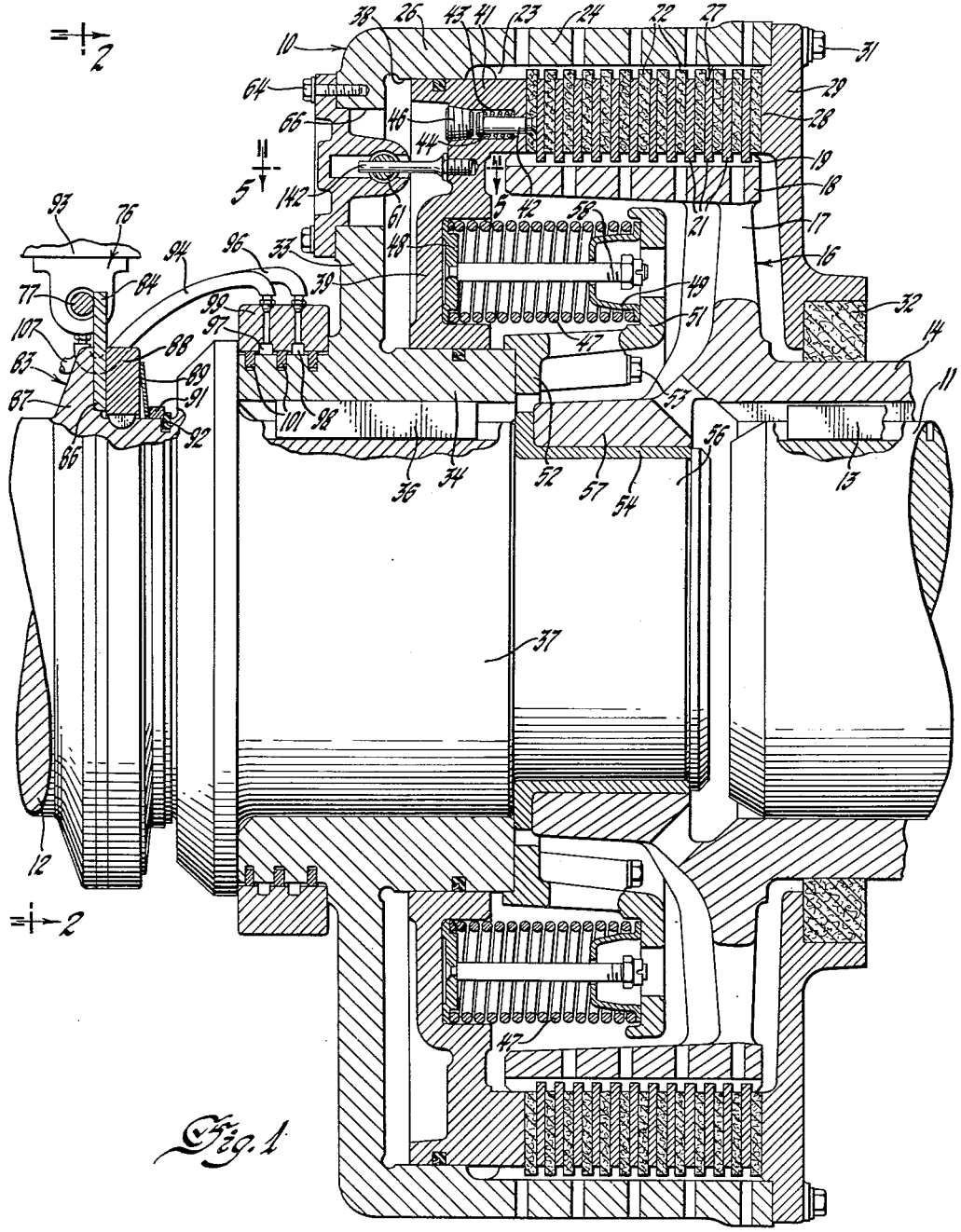
Figure 1 is a longitudinal sectional view in a plane through the driving and driven shafts of an engine and particularly illustrating a clutch mechanism which is provided with controls adapted to operate the driven shaft from the drive shaft under the conditions of operation desired.

In the structure disclosed by Figures 1 and 2, the valve member 77 is actuated by an arm 84 which projects from an annular friction ring 86, into the slot 82 formed at the end of the valve member 77. The friction ring is adapted to be resiliently held between a shoulder 87 formed on the shaft 12 and an annular ring 88 which is held in position against the opposite surface of the ring 86 by an annular spring washer indicated at 89. The spring washer 89 is held in position against the ring 88 by a spacing ring 91 and a snap ring 92 which may be removably secured in a groove formed in the shaft 12. It will be apparent that the ring 86 will tend to rotate with the shaft 12 and will move the valve member 77 into one or the other of two opposed positions within the valve casing 74. In the structure disclosed by Figure 6, the valve member 77 may be manually moved between either of such opposed positions within the casing 76 by operation of the lever 78. In the structure disclosed by Figure 6, the valve member 77 also may be moved manually into an intermediate position between the two extreme positions of the valve member 77 within the casing 74.

In the structure disclosed by Figures 1 and 2, the valve casing 74 is prevented from rotation by a support 93 to which the casing 74 is rigidly secured. The valve member 77 is prevented from moving outwardly beyond the two extreme positions referred to by suitable stops formed in the casing 74 or by other suitable means, not shown. In the structure shown by Figures 1–5, the passages 69 and 71 by which fluid under pressure is supplied to or exhausted from the valve 61, are formed by a pair of conduits 94 and 96 which respectively connect annular ports 72 and 73 to annular ports 97 and 98 which are formed on the inner surface of an annular sealing ring 99. The sealing ring 99 is disposed upon the end of the sleeve 34 rearwardly of the end wall 33 of the driven member 26 of the clutch 10. The ring 99 is prevented from rotation in any suitable manner and the passages 97 and 98 are sealed with respect to one another by expansible rings indicated at 101. The sealing rings 101 also provide bearing surfaces on which the ring 99 is supported against rotation by the sleeve 34. The passages 97 and 98 are respectively connected to the ports 67 and 68 formed in the valve body 63 by passages 102 and 103 which are formed in the sleeve 34, the end wall 33 and in the valve casing 63.

Fluid under pressure is supplied to and exhausted from the control valves 76 and 61 by a main control valve indicated at 104. The main control valve 104 supplies fluid under pressure directly to the control valves 76 for any number of engines through supply conduits such as that indicated at 106 and exhausts fluid under pressure from the same control valves 76 through exhaust conduits 107. The main control valve 104 has a valve casing 108 and a valve member 109 which controls the flow of fluid under pressure to and from the valve casing 108. Fluid under pressure is supplied to valve casing 108 through a passage 110 formed in the casing 108 which leads from any suitable source of fluid under pressure such as the pump, not shown. Fluid is exhausted from the casing 108 to the atmosphere through a passage indicated at 111. The passages 110 and 111 respectively communicate with annular ports 112 and 114 formed in the interior of the casing 108 and around the valve member 109. The passage 106 by which fluid under pressure is supplied by the main control valve 104 to the second control valve 76, is divided in such a way as to communicate with annular ports indicated at 116 and 117 and with pressure chamber 118 formed in the valve casing 108 at one end of the valve member 109. The passage 107 by which fluid is exhausted from the second control valve 76 also communicates with an annular passage 119 formed within the casing 108 around the valve member 109. The valve member 109 also is formed in such a way as to provide elongated ports 121 and 122, each capable of connecting an adjacent pair of the ports 112, 116, 114, 119 and 117. Disposed between one end of the valve member 109 and the adjacent end of the valve casing 108 is a balancing spring indicated at 123. At the opposite end of the casing 108 is a similar balancing spring 124 having one end thereof disposed against the adjacent end of the valve member 109 and the opposite end disposed against a washer indicated at 126. The end of the valve member 109 is extended in such a way as to provide a stem 127 which projects through an opening in the washer 126 and there a pin 128 extends transversely through the stem 127 to limit the outward movement of the washer 126 in response to the force exerted by the spring 124. The washer 126 also supports a cap 129 which extends outwardly of the casing 108 in such manner as to be engaged by the end of a lever 131. The lever 131 is pivotally mounted upon a pin 132 in such a way that operation of the lever will move the cap 129 to compress the springs 123 and 124 to operate the valve member 109.

The valve casing 74 of the control valve 76 also is formed in such a way as to provide an annular port 133 which is located in the casing 74 between the valve ports 72 and 73. The port 133 in the casing 74 communicates with the port 119 in the valve casing 108 through the exhaust passage 107. Annular ports 134 and 136 also are formed in the valve casing 74 in outwardly disposed relation to the valve ports 72 and 73. The fluid supply passage 106 leading to the control valve 76 is divided within the casing 74 in such a way as to communicate with each of the valve ports 134 and 136 and in this manner to provide communication between the latter ports and ports 116 and 117 in the valve casing 108. The valve member 77 in the valve casing 74 also is provided with elongated ports indicated at 137 and 138 and each of which is long enough to provide communication between two or more of the ports 134, 72, 133, 73 and 136 in the valve casing 74.

The valve member 62 in the valve casing 63 of the control valve 61 also is provided with an elongated port indicated at 139. The valve port 139 is long enough to provide communication between either of the ports 67 and 68 in the valve casing 63 and an outlet port 141 which supplies fluid to and exhausts fluid from the cylinder 38. The valve member 62 is actuated between either of the two positions of the valve by a pin 142 which projects through an opening in the middle of the valve member 62 and the opposite end of which is secured in an opening in the head end of the piston 39. In order to actuate the pin 142 to move the valve member 62 between the opposed operative positions of the valve member, the clutch 10 is constructed in such a way as to provide a lost motion connection between the piston 39 and driving element 16 and the driven element 26 of the clutch. This lost motion connection may be formed in any suitable manner as by forming the notches in plates 22 to be wider than the teeth or splines 23 on which the plates are secured to the driven member 26. The extent of the notches and consequently the lost motion between the piston 39 and driving element 16 and the driven element 26 of the clutch 10 is sufficient to cause movement of the valve member 62 by the pin 142 between positions in which the valve member 62 will connect the interior of the cylinder 38 through ports 139 and 141 to either of the ports 67 and 68.

Assuming a plurality of reversible engines, each having a drive shaft 11, a clutch 10 and a driven shaft 12, is adapted to operate a single propeller shaft of a ship, for example and that a single control valve 104 is connected to the first and second control valves 61 and 76 respectively of each clutch 10 in the system, and assuming each of the engines previously has been started and is being driven in the same direction, then the propeller shaft may be started and operated as follows: The main control valve 104 which is illustrated in Figure 6 as being in the Off position at 143, may be moved from the Off position to a Start position indicated at 144. While the lever 131 will be moved an angular distance equal to the distance between the position 143 and the position 144, it will be apparent that the valve member 109 will not at such time be moved a corresponding distance. However, the valve member 109 will be moved by compression of the spring 124 until the port 112 communicating with the fluid pressure supply line 110 is slightly open. As soon as the port 112 is opened to any extent, fluid under pressure will be supplied to the passage 106 through the port 121 in the valve member 109 and the port 116 in the valve casing 108. However, when fluid under pressure is supplied to port 116 and to passage 106, fluid under pressure also will be supplied to the chamber 118 at the end of the valve member 109, thereby tending to aid the spring 123 in further compressing the spring 124 against the spring washer 126. The valve member 109 thereupon will remain in a somewhat balanced position, wherein the port 112, which supplies fluid under pressure to the passage 106, will remain partly open. As soon as fluid under pressure is supplied to the passage 106, it will be apparent that one branch of the passage 106 also will supply fluid under pressure to the port 117. While the port 117 will be partially closed by movement of the valve member 109 which tends to open the valve port 112, the valve port 117 will remain partly open, which will allow fluid under pressure to occupy the space within the port 122 in the valve member 109. This will provide an annular area of fluid pressure affecting the valve member 109 in both directions which will not tend to move the valve member 109 in either direction. However, the fluid under pressure supplied to the port 122 through the partly open port 117 will also be supplied to the port 119 which is in open communication with the passage 107. Fluid under pressure therefore will be supplied to a limited extent to both of the passages 106 and 107 and the valve member 109 will tend to remain in a position in which the fluid pressure supplied to the conduits 106 and 107 is equal. However, the pressure in conduits 106 and 107 will be a reduced pressure and not as great as though fluid had been supplied to one or the other of the conduits 106 or 107 through a completely open port.

Assuming that it is desired to drive the propeller shaft forwardly and that the engines have been started to run in a direction to drive the propeller forwardly, then it will be apparent from examing Figure 6 that the valve member 77 is in a position to connect the cylinder 38 to the passage 106 through the branch of the passage 106 within the valve casing 74, through ports 136, 138 and 73 in the control valve 76, through passage 71 and through ports 68, 139 and 141 in the control valve 61. The reduced pressure supplied by the conduit 106 by so metering the fluid through the main control valve 104 therefore will affect the head end of the piston 39 in such a way as to compress lightly the clutch plates 21 and 22 of the friction clutch element 27 to cause a slipping engagement between the clutch plates which will tend to drive the driven element 26 of each clutch 10 in response to the rotational movement of the driving elements 16 of the clutches 10. The propeller shaft therefore will be started by slipping engagement of the clutch plates 21 and 22 in response to the reduced fluid pressure supplied by the main control valve 104. Such slipping engagement between the clutch plates 21 and 22 of each of the clutches 10 will start the rotation of the driven elements 26 of the clutches 10 and the driven shafts 12 from each of the engines and will start the rotation of the propeller shaft to which all of the driven shafts 12 are connected. After the rotation of the propeller shaft commences, then the lever 131 may be moved from the Start position at 144 to the On or Run position at 146. Such further movement of the lever 131 will cause further compression of the spring 124 sufficient to move the valve member 109 into a position to cut off the port 117 and to completely open the port 112 in the valve casing 108 of the main control valve 104. Thereupon the supply of fluid under pressure will be cut off completely to the passage 107 and the fluid pressure in the system will be supplied to passage 106. The full pressure of the system now affecting passage 106 will be supplied in the manner previously described, to the cylinder 38 which will affect the piston 39 in a manner to compress the clutch plates 21 and 22 until the clutch element 27 does not provide a slipping connection between the driving and driven elements of each of the clutches 10. Thereafter the propeller shaft will be driven through each of the clutches 10 with the full power of the engines driving the shafts 11.

In the structure disclosed by Figure 6, it is possible to lock each of the clutches 10 in such a way that the drive shafts 11 of each of the engines cannot be disconnected from the driven shafts 12 of the engines. This may be done by moving the levers 78 of the valves 76 for all of the clutches 10 from the Forward positions of the valves 76, which are indicated at 147 to the Lock positions of the valves indicated at 148. This movement of the levers 78 will move the valve members 77 far enough to completely close the ports 133 leading to the passages 107 and to open the ports 134 without closing the ports 136. Fluid under pressure from the conduit or passages 106 therefore will be supplied to each of the passages 69 and 71 through ports 134, 137 and 82 and through ports 136, 138 and 73 respectively. However, fluid will continue to be supplied to the cylinders 38 through the passage or ports 141, 139 and 68 and from the passages 71.

However, should one of the engines driving the shafts 11 cease to deliver power, it will be apparent that the driven element 26 of the clutch 10 for that engine will overrun the driving element 16 through the lost motion connection provided in the clutch and consequently the pin 142 for that clutch will move the valve member 62 of the valve 61 for that clutch into a position opposite the position shown by Figure 6. In such opposite position it will be apparent that the valve member 62 will then provide communication between the passage 69 and the interior of the cylinder 38 through the ports 67, 139 and 141. However, since in the Lock position of the valve 76 the passages 69 and 71 both are directly connected to the high pressure fluid supplied to the valve 104 by passage 110, the clutch for this engine will remain in engaged position and the engine will continue to rotate as a load upon the power system. The engine will continue to rotate because the propeller shaft, which is driven by the remaining engines, will rotate the driven shaft 12 of the engine which has lost power and the clutch 10 of this engine will drive the drive shaft 11 of the engine.

However, in the event it is desirable to set the levers 78 so as to release from the propeller shaft any engine affected by a power failure, then the levers 78 for the valves 76 for the clutches 10 for all of the engines should be moved either to the Forward positions indicated by the numeral 147 or into the reverse positions indicated at 149 and corresponding to the forward or reverse directions of rotation of the engines and the propeller shaft. For example, in the position in which the lever 78 is shown in Figure 6, the valve member 77 will be positioned in such manner as to engage the frictional element 27 of the clutch 10 of any engine when the engines are all driven in one direction. However, in the event the engines may be reversed, then it is necessary to move the levers 78 out of the positions indicated at 147, past the positions indicated at 148 and into the positions indicated at 149. Then the positions of the valve members 77 will be reversed in the casings 74 by the overrunning of the driven by the driving elements of the clutches 10, and this will reverse the delivery of high pressure fluid to the conduits 69 and 71. With the levers 78 in the positions indicated at 149, the valve members 77 will be moved to close the ports 136 of the supply lines 106 and to open the ports 134 to the supply lines 106. The valve members 77 also will move beyond the ports 133 so as to close the communication between the passages 107 and 69 through the ports 133, 137 and 72. When these communications are closed, then the valve members 77 will open communication between the passages 107 and 71 through the ports 133, 138 and 73. As soon as the engines have started in the reverse direction, then the lost motion connection between the driving and driven elements of the clutches 10 will move the pins 142 in such manner as to reverse the positions of the valve members 62 in the valve 61. When such valve positions are reversed, then it will be apparent that the cylinder 38 of each clutch member 10 will be connected to the supply of fluid under pressure through the passage 69 rather than the passage 71 of each clutch 10.

However, in the event the structure shown by Figures 1 and 2 is employed, and which embraces the friction clutches 83 for actuating the valves 76, then it is not necessary manually to operate the valve members 77 in order to reverse the operation of the valves 76 to operate the engines in reverse. Under such circumstances, the reversal of the engines driving the clutches 10 will reverse the operation of the driven shafts 12 and as a result of which the friction plates 86 will move in the opposite direction to reverse the positions of the valve members 77. Also when the engines reverse, the pins 142 will reverse the positions of the valve members 62 in the valves 61 and fluid for actuating the pistons 39 in each of the clutches 10 will continue to be supplied by the valves 62.

However, when any engine loses power, that engine may be disconnected from the propeller shaft by the valve 76 for that engine. This will occur because the valve member 77 of the valve may be in either of the opposed positions in which one or the other of the passages 69 or 71 leading from that valve are connected to the source of fluid under pressure. This may be done automatically in the structure shown by Figures 1 and 2 wherein the friction actuated clutches 83 are employed with the clutches 10 or may be done manually in the structure shown by Figure 6, wherein the levers 78 are employed for moving the valve members 77 into either of the positions indicated at 147 or 149. Under either of such circumstances, the driven element 26 of the clutch 10 for the engine which has lost power will overrun the driving element 16 of such clutch and the pin 142 of the clutch will move the valve member 62 of the valve 61 for that clutch into an opposite position for supplying fluid to the cylinder 38 for that clutch. The valve member 62 for the clutch of such an engine will be moved into a position in which the port 141 communicates with the port 67 through the port 139 and the cylinder 38 for the clutch 10 of that engine will be connected to the passage 69. Inasmuch as the passage 69 is connected to the passage 111 of the main control valve 104, the cylinder 38 for such clutch will be connected to the atmosphere. The connections between the passages 69 and 111 are through ports 72, 137 and 133 in valve 76, through passages 107 between the valves 76 and 104, and through ports 119, 122 and 114 in the valve 104.

We claim:

1. A torque responsive clutch device comprising a drive shaft and a driven shaft, said drive shaft being rotatable in opposite directions for similarly rotating said driven shaft, clutch means for connecting said shafts for rotation in either direction, actuating means for engaging and releasing said clutch means in either direction, a lost motion connection between the driving and driven elements of said clutch means and providing for the overrunning of said driving element by said driven element when said clutch means is engaged, a first control for said actuating means, a second control for said actuating means, means for operating said second control for engaging said clutch means when said drive shaft is rotated in either direction, and shift means movable in either direction in response to the overrunning of said driving element by said driven element for reversing said first control and said actuating means to release said clutch means.

2. A torque responsive clutch device comprising a drive shaft and a driven shaft, said drive shaft being rotatable in opposite directions for similarly rotating said driven shaft, clutch means for connecting said shafts for rotation in either direction, actuating means for engaging and releasing said clutch means in either direction, a lost motion connection between the driving and driven elements of said clutch means and providing for the overrunning of said driving element by said driven element when said clutch means is engaged, a first control for said actuating means, a second control for said actuating means, clutch mechanism associated with one of said shafts and responsive to the operation of said one of said shafts in either direction for operating said second control for engaging said clutch means when said drive shaft is rotated in either direction, and shift means movable in either direction in response to the overrunning of said driving element by said driven element for reversing said first control and said actuating means to release said clutch means.

3. A torque responsive clutch device comprising a drive shaft and a driven shaft, said drive shaft being rotatable in opposite directions for similarly rotating said driven shaft, clutch means for connecting said shafts for rotation in either direction, actuating means for engaging and releasing said clutch means in either direction, a lost motion connection between the driving and driven elements of said clutch means and providing for the overrunning of said driving element by said driven element when said clutch means is engaged, a first control for said actuating means, a second control for said actuating means, manually actuated means for operating said second control for engaging said clutch means when said drive shaft is rotated in either direction, and shift means movable in either direction by said driving element and in response to the overrunning of said driving element by said driven element for reversing said first control and said actuating means to release said clutch means in either direction.

4. A torque responsive device comprising a drive shaft and a driven shaft, said drive shaft being rotatable in opposite directions for similarly rotating said driven shaft, clutch means for connecting said shafts for rotation in either direction, actuating means for engaging and releasing said clutch means in either direction, a lost motion connection between the driving and driven elements of said clutch means and providing for the overrunning of said driving element by said driven element when said clutch means is engaged, a first control for said actuating means, a second control for said actuating means, means for operating said second control for engaging said clutch means when said drive shaft is rotated in either direction, and shift means movable in either direction in response to the overrunning of said driving element by said driven element for reversing said first control and said actuating means to release said clutch means, and variable power applying means for supplying through said first and second controls variable amounts of power for variably engaging said clutch means through said actuating means.

5. A torque responsive clutch device comprising a drive shaft and a driven shaft, said drive shaft being rotatable in opposite directions for similarly rotating said driven shaft, clutch means for connecting said shafts for rotation in either direction, actuating means for engaging and releasing said clutch means in either direction, a lost motion connection between the driving and driven elements of said clutch and providing for the overrunning of said driving element by said driven element when said clutch means is engaged, a first control for said actuating means, a second control for said actuating means, a friction clutch associated with one of said shafts and having a driven element connected to said second control for operating said second control for engaging said clutch means when said drive shaft is rotated in either direction, and shift means movable in either direction in response to the overrunning of said driving element by said driven element of said clutch means for reversing said first control and said actuating means to release said clutch means.

6. A torque responsive clutch device comprising a drive shaft and a driven shaft, said drive shaft being rotatable in opposite directions for similarly rotating said driven shaft, clutch means for connecting said shaft and including a driven element and a driving element and a cylinder having a piston therein, friction clutch means in the power train between said piston and said cylinder and adapted to be engaged by axial movement between said piston and cylinder in one direction and released by axial movement between said piston and cylinder in the opposite direction, said friction clutch means being adapted when engaged to connect said piston and said cylinder and said friction clutch means, means for supplying fluid under pressure to said piston and cylinder for axially moving said piston and cylinder for engaging and releasing said friction clutch means, a reversible control valve for said fluid supplying means, and shift means operable in response to relative angular movement between said piston and said cylinder through said lost motion connection for reversing the position of said control valve.

7. A torque responsive clutch device comprising a drive shaft and a driven shaft, said drive shaft being rotatable in opposite directions for similarly rotating said driven shaft, clutch means for connecting said shafts for rotation in either direction, said clutch means including a piston and a cylinder disposed axially with respect to said shafts, a pair of fluid conduits for supplying and exhausting fluid under pressure to the space between said piston and said cylinder for engaging said clutch means, a valve extending across said two conduits for alternately connecting said conduits to said space between said piston and cylinder, means associated with said piston for moving said valve into a position to connect one or the other of said conduits to said space between said piston and cylinder, a lost motion connection in said clutch means and allowing the driven element in said clutch to overrun the driving element thereof for operating said valve moving means, a second valve supplying and exhausting fluid at the same time in different ones of said pair of conduits, and means for reversing said second valve.

8. A torque responsive clutch device comprising a drive shaft and a driven shaft, said drive shaft being rotatable in opposite directions for similarly rotating said driven shaft, clutch means for connecting said shafts for rotation in either direction, said clutch means including a piston and a cylinder disposed axially with respect to said shafts, a pair of fluid conduits for supplying and exhausting fluid under pressure to the space between said piston and said cylinder for engaging said clutch means, a valve extending across said two conduits for alternately connecting said conduits to said space between said piston and cylinder, means associated with said piston for moving said valve into a position to connect one or the other of said conduits to said space between said piston and cylinder, a lost motion connection in said clutch means and allowing the driven element in said clutch to overrun the driving element thereof for operating said valve moving means, a second valve supplying and exhausting fluid at the same time in different ones of said pair of conduits, and means for moving said second valve into a position to supply fluid to both of said conduits.

9. A torque responsive clutch device comprising a drive shaft and a driven shaft, one of said shafts having a cylinder secured concentrically about the axis thereof and the other having a cylindrical wall secured thereto and disposed concentrically within a part of the cylindrical wall of said cylinder, friction clutch plates disposed between said walls with alternate ones of said plates being secured against rotation to one of said walls and with the remaining ones of said plates being secured to the other wall through a lost motion connection permitting limited relative rotation between the remaining ones of said plates and said other wall, an annular piston concentrically disposed in said cylinder and forming an annular expansion chamber between said cylinder and said piston, said piston being positioned to engage said plates to frictionally engage said plates to limit relative rotation between said shafts when said plates are so frictionally engaged, a valve controlling the flow of fluid to and from said expansion chamber, inlet and exhaust passage means associated with one of said cylinder and piston elements and controlled by said valve for admitting and exhausting fluid under pressure through one of said passages to or from said expansion chamber and through said valve, and means associated with the other of said piston and cylinder elements for moving said valve to connect said expansion chamber to the other of said passages when said lost motion connection between said walls permits limited rotational movement between said shafts.

(References on following page)

References Cited in the file of this patent

UNITED STATES PATENTS

| | | |
|---|---|---|
| 1,249,736 | Frink | Dec. 11, 1915 |
| 1,974,740 | Gehres | Sept. 25, 1934 |
| 2,187,835 | Martin | Jan. 23, 1940 |
| 2,492,477 | Henley et al. | Dec. 27, 1949 |
| 2,521,117 | DuBois et al. | Sept. 5, 1950 |
| 2,646,150 | Hobbs | July 21, 1953 |
| 2,715,455 | Miller | Aug. 16, 1955 |

FOREIGN PATENTS

| | | |
|---|---|---|
| 726,652 | Germany | Sept. 10, 1942 |